United States Patent

Goller

Patent Number: 5,419,052
Date of Patent: May 30, 1995

[54] FIELD LAND SURVEY LIGHT

[76] Inventor: Albert Goller, 974 Crabapple Dr., #208, Prospect Heights, Ill. 60070

[21] Appl. No.: 165,672

[22] Filed: Dec. 13, 1993

[51] Int. Cl.$^6$ ............................................. G01C 15/00
[52] U.S. Cl. ...................................... 33/293; 362/431
[58] Field of Search ................. 33/290, 291, 292, 293, 33/299, 227, 241; 362/102, 431, 806

[56] References Cited

U.S. PATENT DOCUMENTS

| | | | |
|---|---|---|---|
| 1,756,144 | 4/1930 | Ames | 362/431 |
| 3,909,952 | 10/1975 | Lagasse | 33/299 |
| 3,958,885 | 5/1976 | Stackinger et al. | |
| 4,173,035 | 10/1979 | Hoyt | 362/806 |
| 4,343,500 | 8/1982 | Buckley et al. | 33/293 |
| 5,027,521 | 7/1991 | Del Giornio | 33/293 |
| 5,032,014 | 7/1991 | Toga . | |
| 5,073,704 | 12/1991 | Encaoua . | |
| 5,086,379 | 2/1992 | Denison et al. | 362/431 |
| 5,091,627 | 2/1992 | Kimura . | |
| 5,226,718 | 7/1993 | Lin | 362/102 |

FOREIGN PATENT DOCUMENTS 4-93714  3/1992  Japan ...................................... 33/293

Primary Examiner—William A. Cuchlinski, Jr.
Assistant Examiner—G. Bradley Bennett

[57] ABSTRACT

A field land survey light adapted for securement between a target and a prism. The light includes a hollow cylindrical housing having a forward end, a rearward end, an upper portion, and a lower portion. The light further includes a lens positioned within the forward end, and a backing plate positioned within the rearward end. A lamp is positioned within the hollow cylindrical housing. The lamp is adapted to project light through the lens of the housing. A first cylindrical coupling serves to secure the field land survey light to the target of a surveying apparatus. The coupling has a closed bottom end, an opened top end, and an interior surface. The closed bottom end is secured to the upper portion of the hollow cylindrical housing. A set of threads is formed upon the interior surface of the first cylindrical coupling. A keeper spring is secured to the closed bottom end of the coupling. The keeper spring serves to provide a biasing force to any element positioned within the coupling. A second cylindrical coupling serves to secure the field land survey light to the prism of a surveying apparatus. The coupling has a closed bottom end, an opened top end, and an interior surface. The closed bottom end is secured to the lower portion of the hollow cylindrical housing. A set of threads is formed upon the interior surface of the second cylindrical coupling. A keeper spring is secured to the closed bottom end of the coupling. The keeper spring serves to provide a biasing force to any element positioned within the coupling.

4 Claims, 4 Drawing Sheets

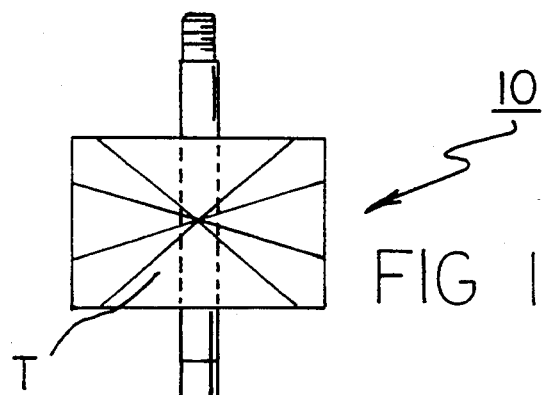
FIG 1
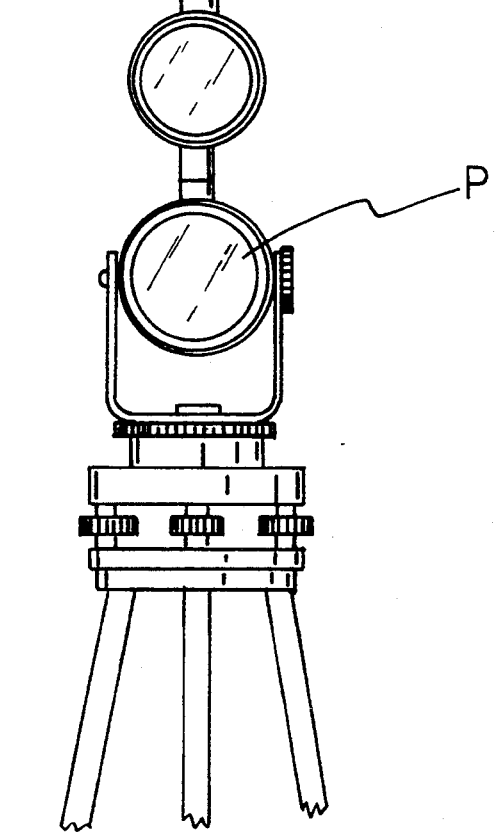
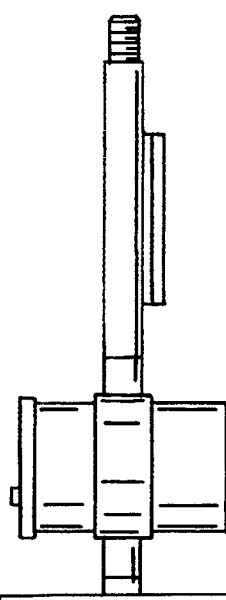
FIG 2
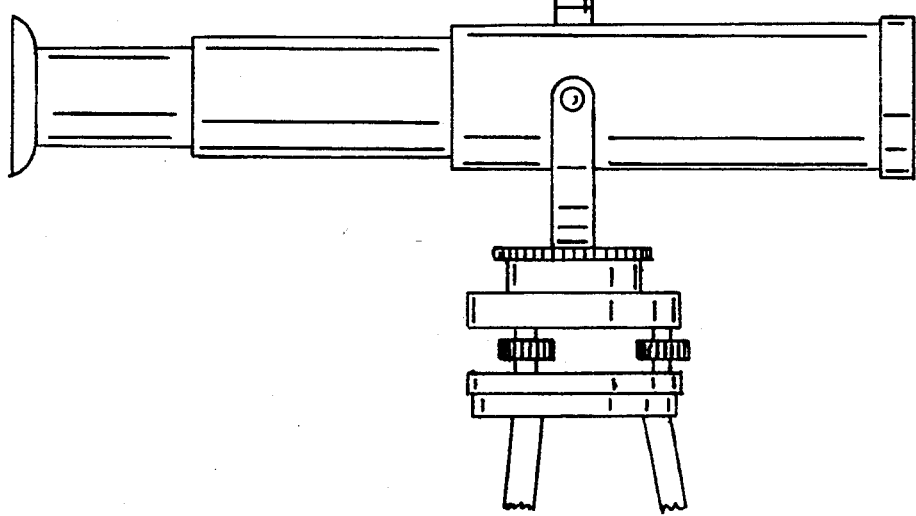

FIELD LAND SURVEY LIGHT

BACKGROUND OF THE INVENTION

1. Field of the Invention

The present invention relates to field land survey light and more particularly pertains to a device which is positionable between an existing target and prism.

2. Description of the Prior Art

The use of surveying instruments is known in the prior art. More specifically, surveying instruments heretofore devised and utilized for the purpose of determining ground boundaries are known to consist basically of familiar, expected, and obvious structural configurations, notwithstanding the myriad of designs encompassed by the crowded prior art which has been developed for the fulfillment of countless objectives and requirements.

For example U.S. Pat. No. 3,958,885 to Stockinger et al. discloses an optical surveying apparatus with an artificial light scale illuminating system.

U.S. Pat. No. 5,027,521 to Del Giorgio discloses a ground-based surveying system. The system utilizes a collimated beam of light to define the location of a reference point selected during a ground survey.

U.S. Pat. No. Number 5,032,014 to Toga discloses a datum beam projecting apparatus for use with surveying equipment. The apparatus projects light rays emitted from a light source as a datum beam through a projecting lens system.

U.S. Pat. No. 5,073,704 to Encaoua discloses an optical sighting and aiming apparatus.

Furthermore, U.S. Pat. No. 5,091,627 to Kimura discloses a laser beam controller for surveying equipment. The controller includes a laser beam irradiation unit for irradiating a target with a laser beam.

In this respect, the field land survey light according to the present invention substantially departs from the conventional concepts and designs of the prior art, and in doing so provides an apparatus primarily developed for use with existing surveying equipment.

Therefore, it can be appreciated that there exists a continuing need for new and improved field land survey light which can be used with existing surveying equipment. In this regard, the present invention substantially fulfills this need.

SUMMARY OF THE INVENTION

In view of the foregoing disadvantages inherent in the known types of surveying instruments now present in the prior art, the present invention provides an improved field land survey light. As such, the general purpose of the present invention, which will be described subsequently in greater detail, is to provide a new and improved field land survey light and method which has all the advantages of the prior art and none of the disadvantages.

To attain this, the present invention essentially comprises a field land survey light adapted for securement between a target and a prism. The light includes a hollow cylindrical housing having a forward end, a rearward end, an upper portion, and a lower portion. A lens is positioned within the forward end, and a backing plate is positioned within the rearward end. An on/off switch is positioned within the backing plate of the hollow cylindrical housing. A blinker timer is positioned within the rearward end of the hollow cylindrical housing. The blinker timer is operatively coupled to the on/off switch. A source of power is positioned within the hollow cylindrical housing. The source of power is operatively coupled to the on/off switch and the blinker timer. A concave reflector is positioned within the forward end of the hollow cylindrical housing. The concave reflector is configured and positioned to reflect light through the lens of the hollow cylindrical housing. An aperture is formed centrally within the concave reflector. A lamp is positioned within the aperture of the concave reflector. A first lead serves to interconnecting the source of power, the on/off switch, the blinker timer and the lamp. A second lead serves to interconnect the source of power and the lamp. A first cylindrical coupling serves to secure the field land survey light to the target of a surveying apparatus. The coupling has a closed bottom end, an opened top end, and an interior surface. The closed bottom end is secured to the upper portion of the hollow cylindrical housing. A set of threads is formed upon the interior surface of the first cylindrical coupling. A keeper spring is secured to the closed bottom end of the coupling. The keeper spring serves to provide a biasing force to any element positioned within the coupling. A second cylindrical coupling serves to secure the field land survey light to the prism of a surveying apparatus. The coupling has a closed bottom end, an opened top end, and an interior surface. The closed bottom end is secured to the lower portion of the hollow cylindrical housing. A set of threads is formed upon the interior surface of the second cylindrical coupling. A keeper spring is secured to the closed bottom end of the coupling. The keeper spring serves to provide a biasing force to any element positioned within the coupling.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved field land survey light which have all the advantages of the prior art surveying instruments and none of the disadvantages.

It is another object of the present invention to provide new and improved field land survey light which may be easily and efficiently manufactured and marketed.

It is further object of the present invention to provide new and improved field land survey light which are of durable and reliable constructions.

An even further object of the present invention is to provide new and improved field land survey light which are susceptible of a low cost of manufacture with regard to both materials and labor, and which accordingly are then susceptible of low prices of sale to the consuming public, thereby making such field land survey light economically available to the buying public.

Still yet another object of the present invention is to provide new and improved field land survey light which provide in the apparatuses and methods of the prior art some of the advantages thereof, while simultaneously overcoming some of the disadvantages normally associated therewith.

Even still another object of the present invention is to provide a survey light that can be used in conjunction with existing surveying equipment.

Lastly, it is an object of the present invention to provide new and improved field land survey light adapted for securement between a target and a prism. The light includes a hollow cylindrical housing having a forward end, a rearward end, an upper portion, and a lower portion. The light further includes a lens positioned within the forward end, and a backing plate positioned within the rearward end. A lamp is positioned within the hollow cylindrical housing. The lamp is adapted to project light through the lens of the housing. A first cylindrical coupling serves to secure the field land survey light to the target of a surveying apparatus. The coupling has a closed bottom end, an opened top end, and an interior surface. The closed bottom end is secured to the upper portion of the hollow cylindrical housing. A set of threads is formed upon the interior surface of the first cylindrical coupling. A keeper spring is secured to the closed bottom end of the coupling. The keeper spring serves to provide a biasing force to any element positioned within the coupling. A second cylindrical coupling serves to secure the field land survey light to the prism of a surveying apparatus. The coupling has a closed bottom end, an opened top end, and an interior surface. The closed bottom end is secured to the lower portion of the hollow cylindrical housing. A set of threads is formed upon the interior surface of the second cylindrical coupling. A keeper spring is secured to the closed bottom end of the coupling. The keeper spring serves to provide a biasing force to any element positioned within the coupling.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the field land survey light constructed in accordance with the principles of the present invention.

FIG. 2 is a side elevational view of the first embodiment of the present invention.

The same reference numerals refer to the same parts through the various FIGS.

DESCRIPTION OF THE PREFERRED EMBODIMENT

Figure 3:
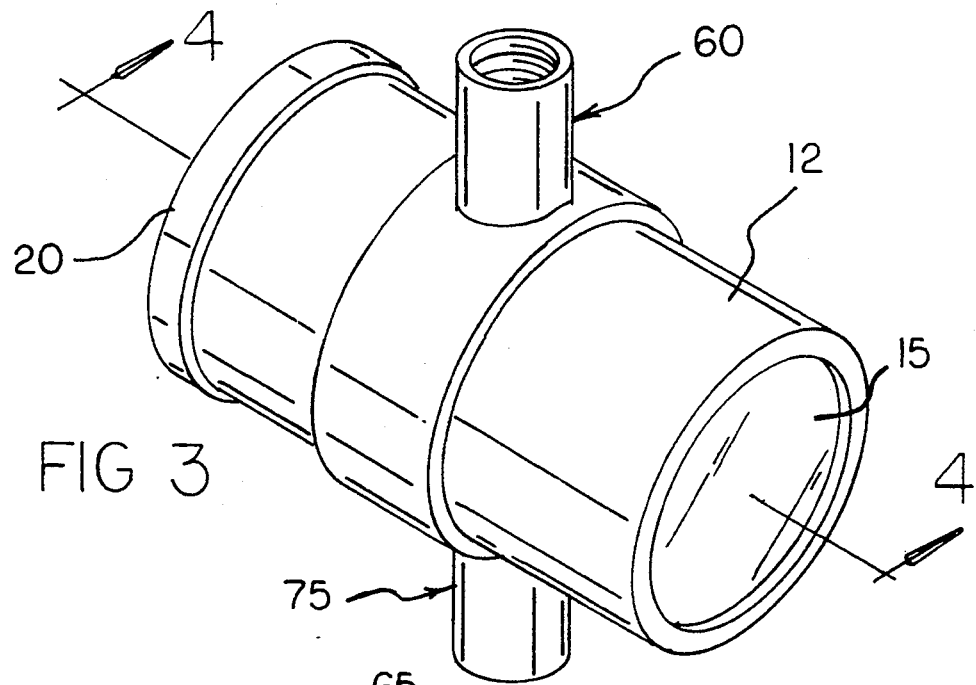
FIG. 3 is a perspective view of the survey light in accordance with the first embodiment of the present invention.
Figure 4:
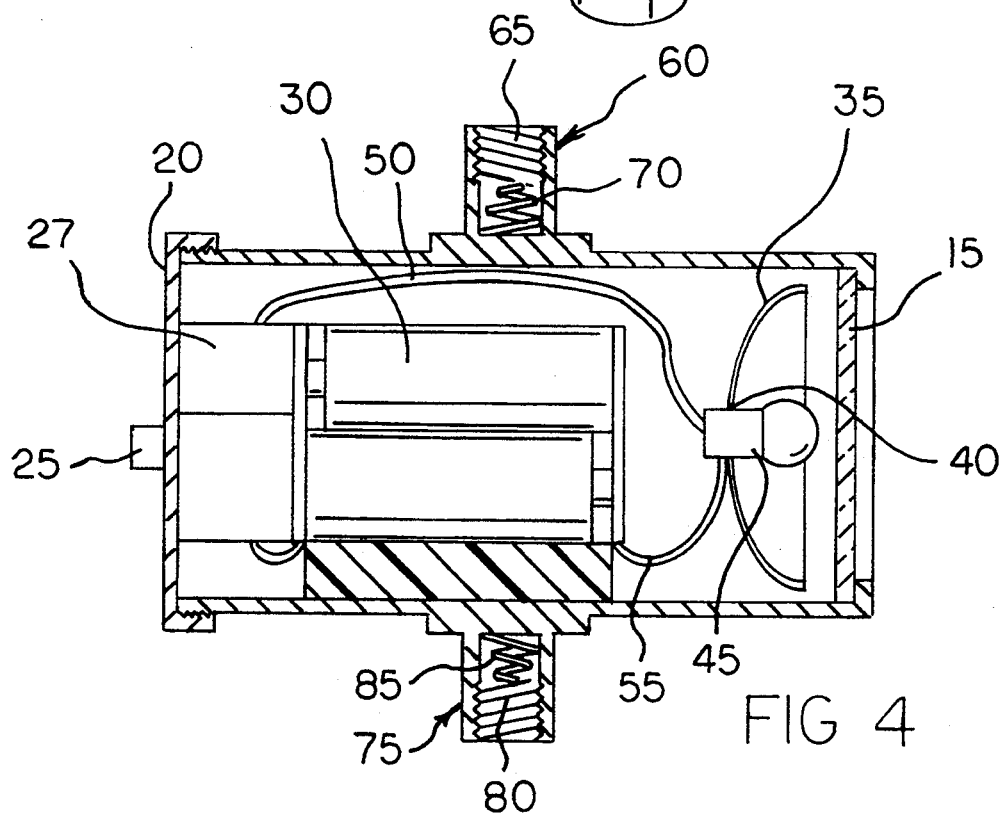
FIG. 4 is a cross sectional view taken along line 4—4 of FIG. 3.

With reference now to the drawings, and in particular to FIG. 1 thereof, the preferred embodiment of the new and improved field land survey light embodying the principles and concepts of the present invention and generally designated by the reference numeral 10 will be described.

The present invention relates to a field land survey light 10 adapted for securement between a target and a prism. Note in particular FIGS.1 through 4. The field land survey light 10 provides a flashing light that is easy to identify and facilitates setup of the prism and target. In its broadest context, the field land survey light 10 includes a hollow cylindrical housing 12 with an interior blinking light. The land survey light 10 further includes two cylindrical couplings 60 and 75 which enable the light 10 to be secured between a target and a prism.

The hollow cylindrical housing 12 includes a forward end, a rearward end, an upper portion, and a lower portion. A conventional lens 15 is positioned within the forward end of the housing 12. Furthermore, a backing plate 20 is positioned within the rearward end of the housing 12. The housing should be made air tight to prevent water or other contaminates from entering into the housing 12.

An on/off switch 25 is positioned within the backing plate 20 of the hollow cylindrical housing 12. The on/off switch 25 functions to control the operational state of the lamp 45 in a conventional manner. Furthermore, a blinker timer 27 is positioned within the rearward end of the hollow cylindrical housing 12. The blinker timer 27 is operatively coupled to the on/off switch 25. The blinker timer 27 serves to transform a conventional lamp into a flashing light source. Thus, the selection of the blinker timer 27 determines the rate at which the lamp 45 flashes.

A source of power 30 is positioned within the hollow cylindrical housing 12. The source of power 30 is operatively coupled to both the on/off switch 25 and the blinker timer 27. Conventional batteries would suffice as a source of power. It is also envisioned that the present invention could be coupled to an external source of power by way of an electric cord.

Yet another element positioned within the housing is a concave reflector 35. The concave reflector 35 is positioned within the forward end of the hollow cylindrical housing 12. The concave reflector 35 is configured and positioned to reflect light through the lens 15 of the hollow cylindrical housing 12. An aperture 40 is formed centrally within the concave reflector 35. A lamp 45 is positioned within the aperture 40 of the concave reflector 35. A first electrical lead 50 serves to interconnect the source of power 30, the on/off switch 25, the blinker timer 27 and the lamp 45. Furthermore, a second lead 55 serves to interconnect the source of power 30 and the lamp 45.

A first cylindrical coupling 60 serves to secure the field land survey light be to the target of a surveying apparatus. The coupling has a closed bottom end, an opened top end, and an interior surface. The closed bottom end is secured to the upper portion of the hollow cylindrical housing. A set of threads 65 are formed upon the interior surface of the first cylindrical coupling 60. Additionally, a keeper spring 70 is secured to the closed bottom end of the coupling 60. The keeper spring 70 serves to provide a biasing force to any element positioned within the coupling 60.

A second cylindrical coupling 75 serves to secure the field land survey light 10 to the prism of a surveying apparatus. The coupling has a closed bottom end, an opened top end, and an interior surface. The closed bottom end is secured to the lower portion of the hollow cylindrical housing 12. A set of threads 80 is formed upon the interior surface of the second cylindrical coupling 75. Additionally, a keeper spring 80 is secured to the closed bottom end of the coupling 75. The keeper spring 80 serves to provide a biasing force to any element positioned within the coupling.

The second embodiment of the present invention is substantially the same as the first embodiment. However, the second embodiment includes a lens attachment 90 having a first extent with a first peripheral area 95 and a second extent with a second peripheral area 100.

Figure 5:
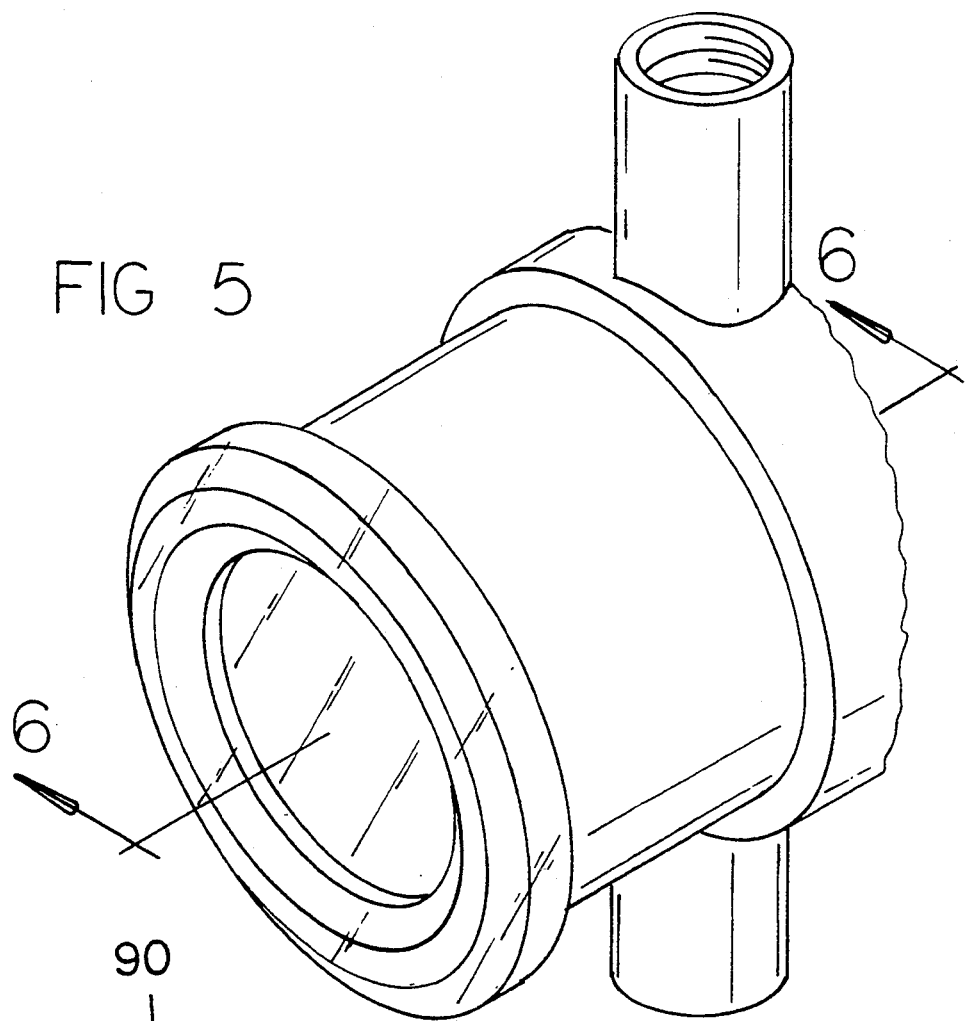
FIG. 5 is a view of the survey light in accordance with the second embodiment of the present invention.
Figure 6:
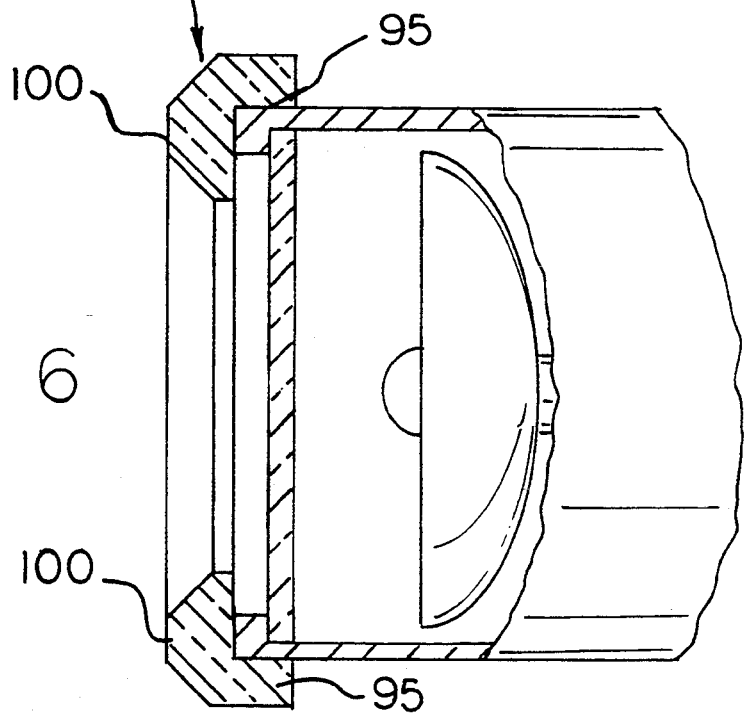
FIG. 6 is a cross sectional view taken along line 6—6 of FIG. 5.

The first peripheral area 95 is adapted for securement over the forward end of the hollow cylindrical housing 12. Note FIGS. 5 and 6. The second peripheral area 100 includes an circular lens portion. The circular lens portion of the second peripheral area is adapted to reflect a portion of the light projected by the lamp and redirect it back toward the rearward end of the hollow cylindrical housing 12. Thus, the circular lens portion of the second extent aids in illuminating the entire surveying apparatus in a night environment.

Figure 7:
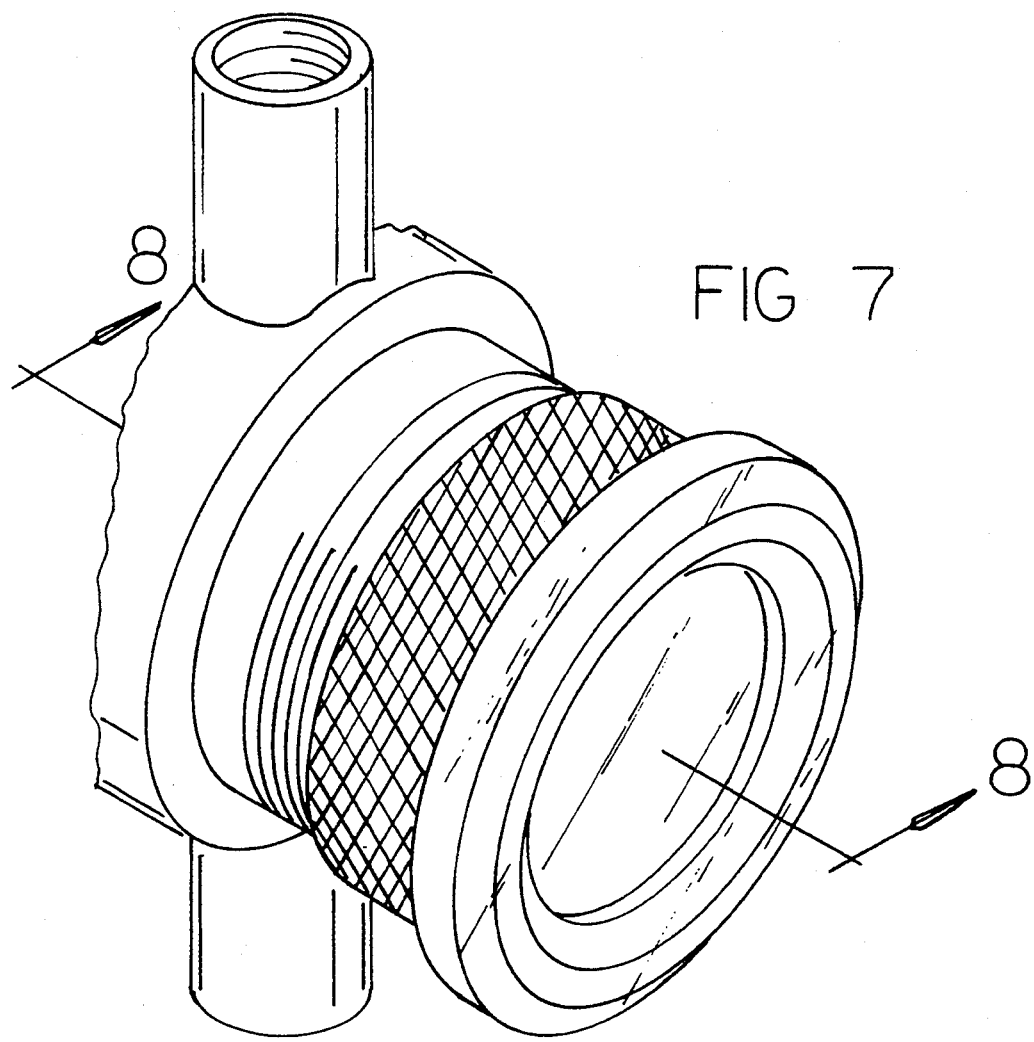
FIG. 7 is a view of the survey light in accordance with the third embodiment of the present invention.
Figure 8:
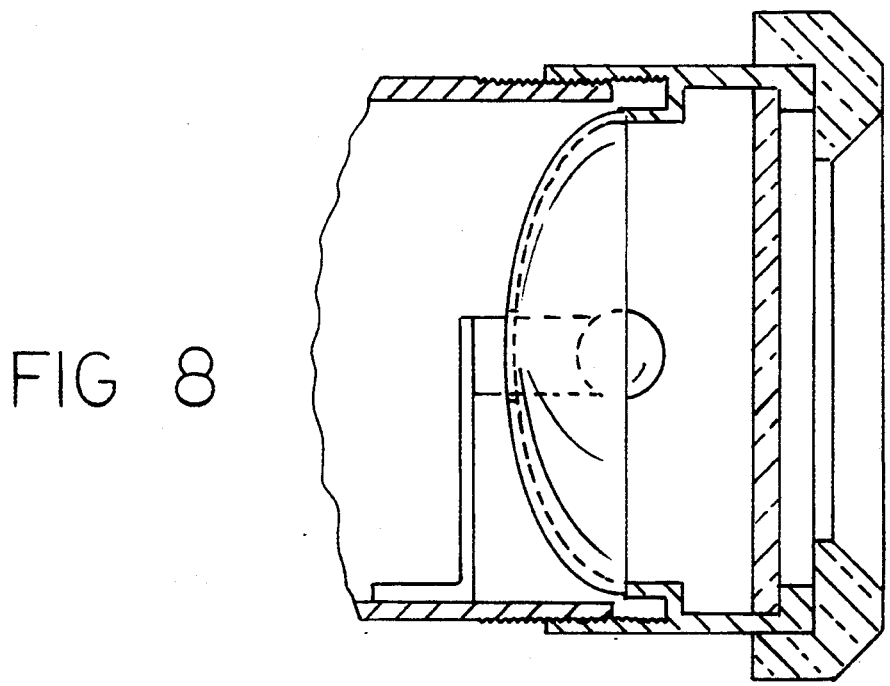
FIG. 8 is a cross sectional view taken along line 8—8 of FIG. 7.

In the third embodiment of the present invention as shown in FIGS. 7 and 8, the forward end of the hollow cylindrical housing 12 is threadably coupled to the rearward end of the hollow cylindrical housing 12. Furthermore, the concave reflector 35 is coupled to the forward end of the hollow cylindrical housing 12. Furthermore, the lamp 45 is secured to the rearward end of the hollow cylindrical housing 12. Thus, in the third embodiment, rotation of the forward end of the hollow cylindrical housing 12 serves to adjust the distance between the lamp 45 and the concave reflector 35. The third embodiment of the present invention also makes use of the lens attachment of the second embodiment.

The profession of land surveying puts tremendous demands on the survey party. This is due to the fact that all length and angle measurements must be infinitely accurate. This margin for error is greatly magnified as the distance between turning points and feature points increases. The difficulty in sighting over long distances is effected by many factors, the major being the atmospheric conditions at the site during measurement.

At the current time, small targets are employed for setting up and sighting a transit line. These can be very difficult to see, especially under less than optimal atmospheric conditions. The area and size of the target effect the accuracy of the sighting. Small variances in measuring an angle because of poor sighting can result in gross errors when the line is closed.

The field land survey light is a device that is used in conjunction with the current target and prism, installing between them. The field land survey light provides a flashing light that is easy to identify, even from distances up to ½ mile. It will facilitate the prism setup, reducing the time necessary to properly set up the prism and target. The light presents a single point source for the most accurate sighting possible. It is durably constructed to withstand the rigors of surveying, and the high volume of assembly and disassembly that it must endure. It can be used and appreciated by all types of surveyors.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A field land survey light adapted for securement between a target and a prism comprising, in combination:

a hollow cylindrical housing having a forward end, a rearward end, an upper portion, and a lower portion, a lens positioned within the forward end, a backing plate positioned within the rearward end;

an on/off switch positioned within the backing plate of the hollow cylindrical housing;

a blinker timer positioned within the rearward end of the hollow cylindrical housing, the blinker timer being operatively coupled to the on/off switch;

a source of power positioned within the hollow cylindrical housing, the source of power being operatively coupled to the on/off switch and the blinker timer;

a concave reflector positioned within the forward end of the hollow cylindrical housing, the concave reflector configured and positioned to reflect light through the lens of the hollow cylindrical housing, an aperture formed centrally within the concave reflector, a lamp positioned within the aperture of the concave reflector;

a first lead interconnecting the source of power, the on/off switch, the blinker timer and the lamp, a second lead interconnecting the source of power and the lamp;

a first cylindrical coupling serving to secure the field land survey light to the target of a surveying apparatus, the coupling having a closed bottom end, an opened top end, and an interior surface, the closed bottom end being secured to the upper portion of the hollow cylindrical housing, a set of threads formed upon the interior surface of the first cylindrical coupling, a keeper spring secured to the closed bottom end of the coupling, the keeper spring serving to provide a biasing force to any element positioned within the coupling; and a second cylindrical coupling serving to secure the field land survey light to the prism of a surveying apparatus, the coupling having a closed bottom end, an opened top end, and an interior surface, the closed bottom end being secured to the lower portion of the hollow cylindrical housing, a set of threads formed upon the interior surface of the second cylindrical coupling, a keeper spring secured to the closed bottom end of the coupling, the keeper spring serving to provide a biasing force to any element positioned within the coupling.

2. A field land survey light adapted for securement between a target and a prism comprising:

a hollow cylindrical housing having a forward end, a rearward end, an upper portion, and a lower portion, a lens positioned within the forward end, a backing plate positioned within the rearward end;

a lamp positioned within the hollow cylindrical housing, the lamp adapted to project light through the lens of the housing;

a first cylindrical coupling serving to secure the field land survey light to the target of a surveying apparatus, the coupling having a closed bottom end, an opened top end, and an interior surface, the closed bottom end being secured to the upper portion of the hollow cylindrical housing, a set of threads formed upon the interior surface of the first cylindrical coupling, a keeper spring secured to the closed bottom end of the coupling, the keeper spring serving to provide a biasing force to any element positioned within the coupling; and a second cylindrical coupling serving to secure the field land survey light to the prism of a surveying apparatus, the coupling having a closed bottom end, an opened top end, and an interior surface, the closed bottom end being secured to the lower portion of the hollow cylindrical housing, a set of threads formed upon the interior surface of the second cylindrical coupling, a keeper spring secured to the closed bottom end of the coupling, the keeper spring serving to provide a biasing force to any element positioned within the coupling.

3. The field land survey light as described in claim 2 and further comprising a lens attachment having a first extent with a first peripheral area and a second extent with a second peripheral area, the first peripheral area adapted for securement over the forward end of the hollow cylindrical housing and the second peripheral area including a circular lens portion, the lens portion of the second peripheral area adapted to reflect a portion of the light projected by the lamp and redirect it back toward the rearward end of the hollow cylindrical housing.

4. The field survey light as described in claim 2 wherein the forward end of the hollow cylindrical housing is threadably coupled to the rearward end of the hollow cylindrical housing, and further including a concave reflector coupled to the forward end of the hollow cylindrical housing, the lamp is secured to the rearward end of the hollow cylindrical housing, rotation of the forward end of the hollow cylindrical housing serving to adjust the distance between the lamp and the concave reflector and further including a lens attachment having a first extent with a first peripheral area and a second extent with a second peripheral area, the first peripheral area adapted for securement over the forward end of the hollow cylindrical housing and the second peripheral area including a circular lens portion, the lens portion of the second peripheral area adapted to reflect a portion of the light projected by the lamp and redirect it back toward the rearward end of the hollow cylindrical housing.

* * * * *